United States Patent [19]
Ludwig

[11] 3,745,869
[45] July 17, 1973

[54] SLICING BLADE

[76] Inventor: Clarence H. Ludwig, 816 W. Cherry St., Bluffton, Ind. 46714

[22] Filed: Mar. 10, 1972

[21] Appl. No.: 233,610

[52] U.S. Cl.................... 83/788, 83/846, 30/355, 144/223
[51] Int. Cl............................................. B26d 1/26
[58] Field of Search.................. 83/212.1, 846, 835, 83/788; 144/222, 223, 238, 239; 30/352, 355, 346.55, 380

[56] References Cited
UNITED STATES PATENTS
3,658,106  4/1972  Elsasser ........................... 30/355 X
2,757,697  8/1956  Simmons et al. ................ 30/355 X
2,596,851  5/1952  Hansen ............................. 83/846

Primary Examiner—Andrew R. Juhasz
Assistant Examiner—W. D. Bray
Attorney—John A. Young

[57] ABSTRACT

A flexible slicing band has a relatively thin cross section to provide a flexible endlessly movable band which includes a cutting edge scalloped to provide a plurality of regularly spaced peaks and valleys. The peaks terminate in cutting points and the profile of the cutting edge is tapered from each side of the blade toward the cutting edge. The cutting edge is scalloped to include a cutting corner by reverse curvature of the cutting edge intermediate each valley and crest of the scallops in order to prolong the life of the blade. A superimposed grinding may be made on the cutting edge to form a compound taper reducing the cross section of the blade in the vicinity of the cutting edge to provide additional relief at the cutting edge as the blade passes through the article intended to be cut.

6 Claims, 18 Drawing Figures

PATENTED JUL 17 1973 3,745,869

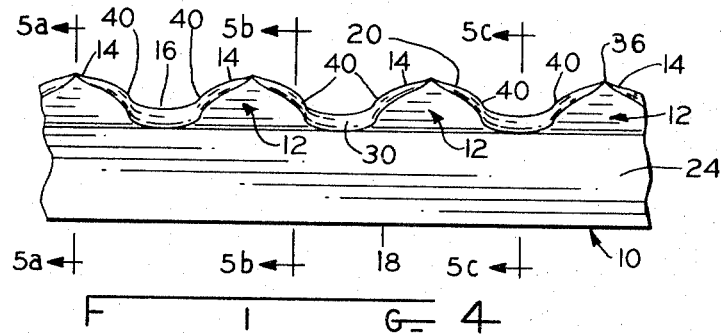
FIG. 4
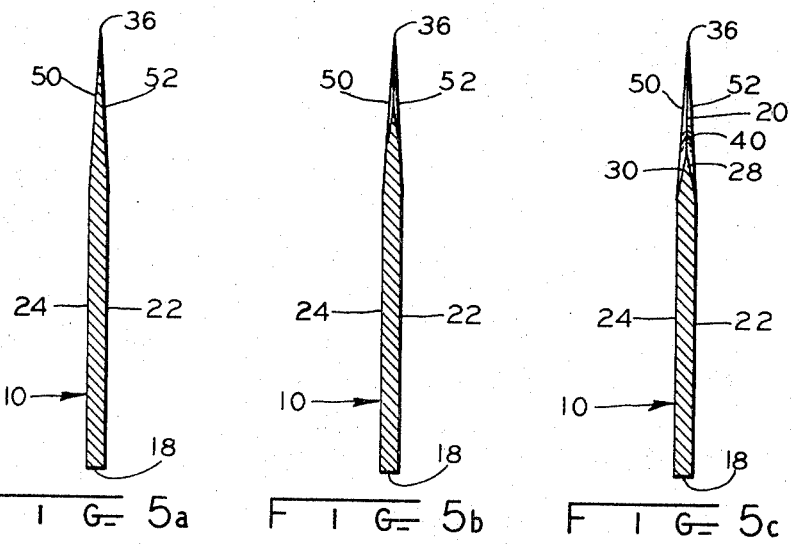
FIG. 5a  FIG. 5b  FIG. 5c
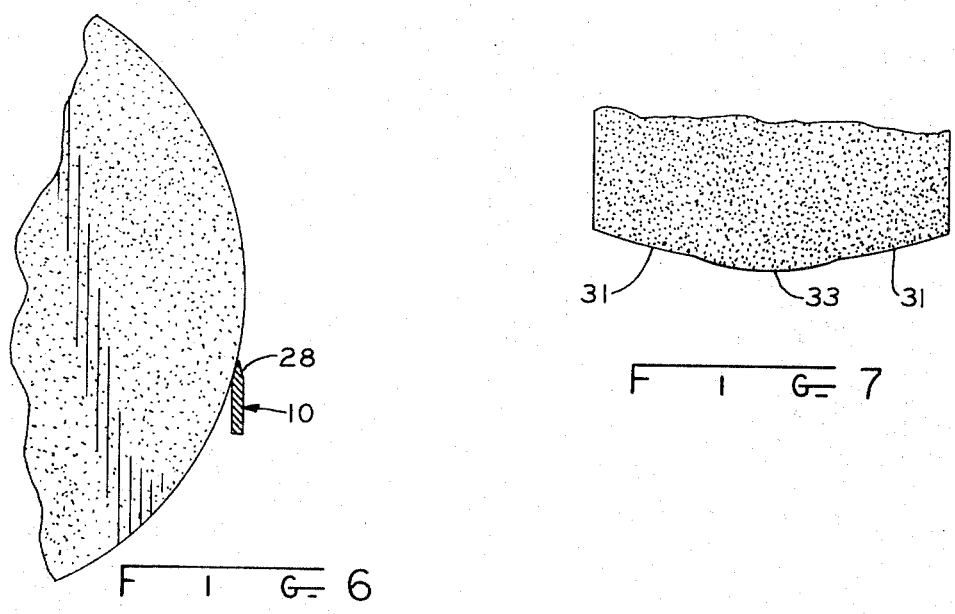
FIG. 6
FIG. 7

SLICING BLADE

BACKGROUND OF THE INVENTION

It is the practice to slice freshly baked bread with a flexible band having a cutting edge which passes through the bread after it is baked. Because the blade tends to become dulled after a period of time, it must be rehoned and the useful life of the blade is determined by the intervals between honings and the number of honings which the blade can sustain before the cutting edge is completely worn away.

In the art of slicing bread, the practice is to pass an endless band having a cutting edge through the bread after the bread is baked and to slice the bread before it is packaged.

Contrary to what might be thought, freshly baked bread has a considerable dulling effect on the cutting edge greater than might be appreciated. It is not uncommon for the wearlife of a cutting edge to be useful for only a matter of three days before it must be rehoned on the machine. It is important to have a fine cutting edge in order that the bread can be sliced without producing a tearing or shredding action as it passes through the bread.

In honing the blade for re-establishing the blade keeness, inevitably some of the material is abraded away and eventually the configuration of the cutting edge changes to an extent making it no longer useful for its intended bread cutting function at which time the band must be completely replaced.

OBJECTS OF THE INVENTION

It is the principal object of the present invention to provide a new and improved blade configuration which will hold its cutting edge for a longer period of time and which can be honed a greater number of times before requiring replacement of the band.

It is another object of the present invention to provide a cutting blade which has a longer useful life between honings and which can sustain a greater number of honings before the cutting band is discarded.

Another object of the invention is to provide a new longer-wear band which combines longer wearing properties with improved cutting properties especially useful for slicing bread without tearing or shredding the bread and thus producing clean slices and in which the sliced loaf is substantially undistorted.

Other objects and features of the present invention will become apparent from a consideration of the following description which proceeds with reference to the accompanying drawings wherein certain selected example embodiments are chosen to illustrate the invention.

DRAWINGS

Figure 1:
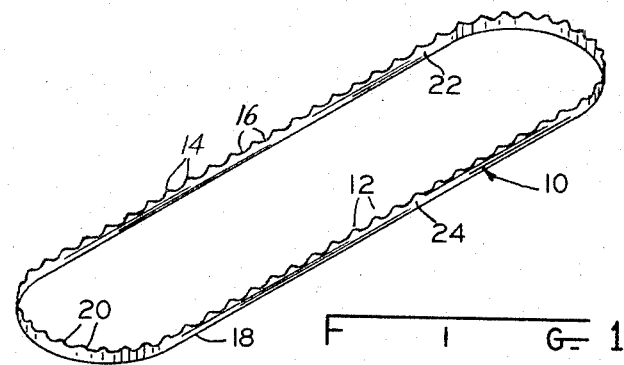
FIG. 1 is an isometric view of a cutting band illustrating the plurality of scallops which are formed on the cutting edge and indicating the general configuration of the band during the time of use.
Figure 2:
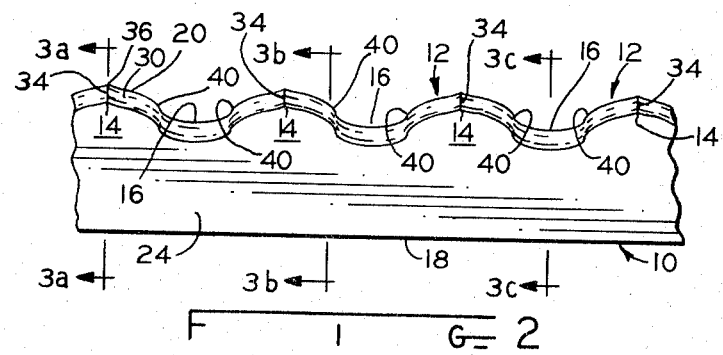
FIG. 2 is an enlarged fragmentary view illustrating a portion of the band in side elevation.
Figures 3A, 3B, 3C:
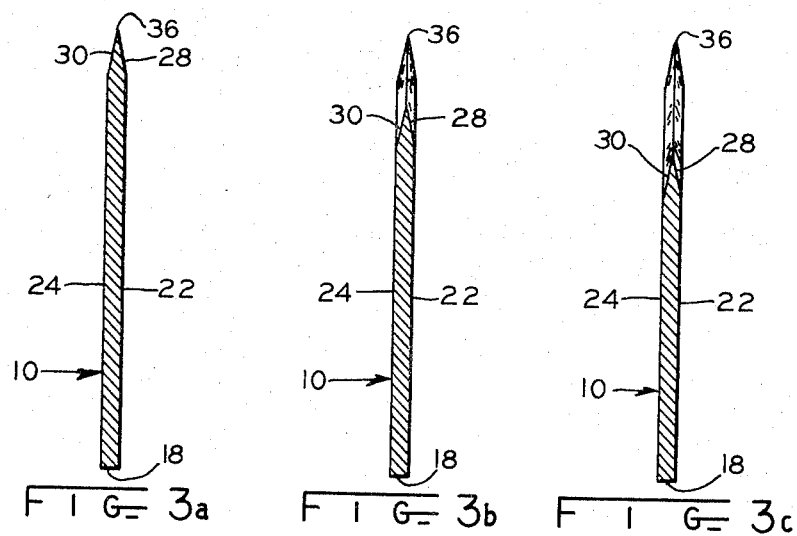
Figure 7A:
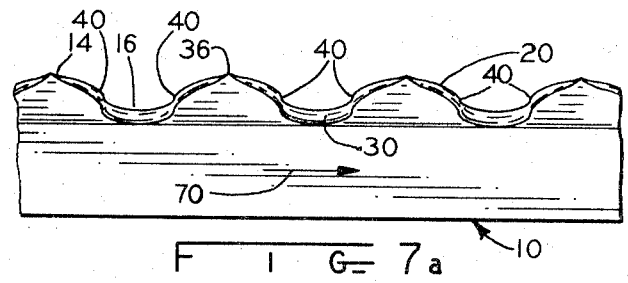
Figure 7B:
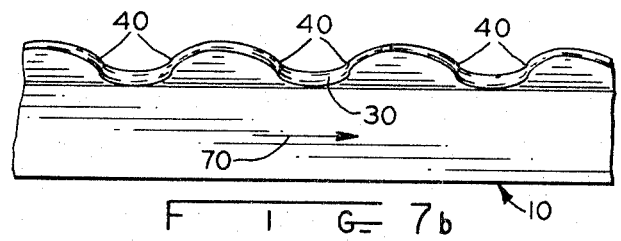
Figure 7C:
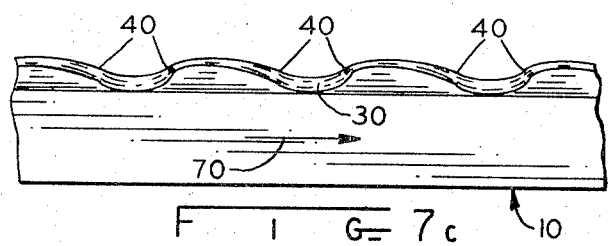
Figure 8:
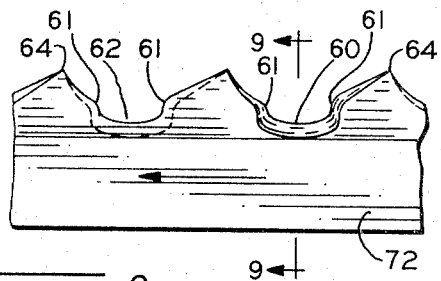
Figure 10:
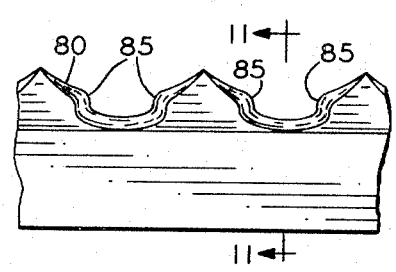
Figure 9:
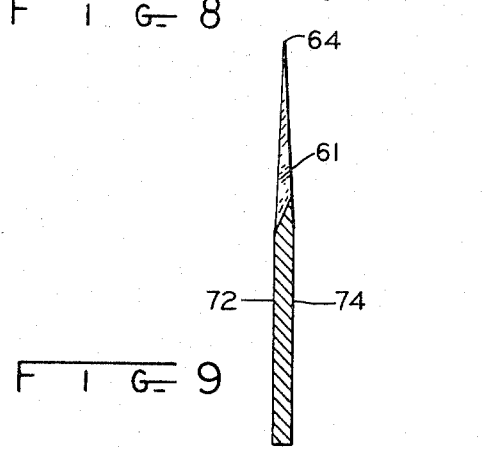
Figure 11:
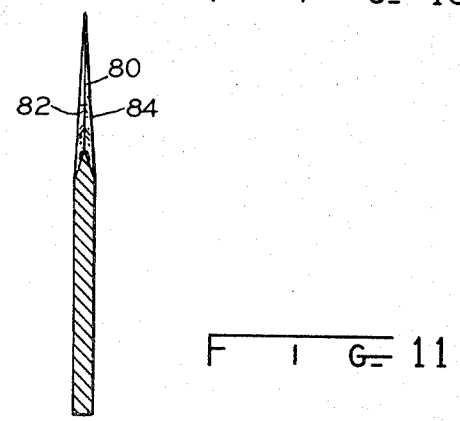

FIGS. 3(a), 3(b) and 3(c) are sectional views taken respectively on the lines 3(a)—3(a), 3(b)—3(b) and 3(c)—3(c) of FIG. 2;

FIG. 4 illustrates the same band as in FIG. 2 but with a superimposed longitudinal grinding along the profile of the cutting edge of the band which provides a tapered additional relief for the blade as it passes through the bread;

FIGS. 5(a), 5(b) and 5(c) are sectional views taken respectively on section lines 5(a)—5(a), 5(b)—5(b) and 5(c)—5(c);

FIG. 6 is a detailed view showing the grinding wheel and blade in which the scallop shown in FIG. 2 is formed on the blade at each side thereof;

FIG. 7 is an enlarged fragmentary view illustrating the working face of the grinding wheel for forming the improved blade construction of FIG. 2;

FIGS. 7(a), 7(b) and 7(c) illustrate the progressive wear pattern which occurs on the blade as it is rehoned and eventually loses its effectiveness;

FIG. 8 is a fragmentary view in side elevation showing a second embodiment of the invention incorporating my improved blade construction, the blade in this case being formed from tapered edges appearing alternately at first one blade side and then the other blade side;

FIG. 9 is a section view taken on line 9—9 of FIG. 8;

FIG. 10 is a fragmentary view in side elevation of a further embodiment of the invention; and, FIG. 11 is a section view taken on line 11—11 of FIG. 10.

GENERAL DESCRIPTION OF THE INVENTION

A continuous flexible band 10 has a series of regularly spaced scallops 12 which form throughout the length of the band 10 a number of peaks 14 and valleys 16 which are spaced at regular intervals throughout the endless length of flexible band 10. The band 10 is of relatively thin cross section so that it can be passed over rollers and move endlessly during the cutting of loaves of bread or the like. Band 10 has a base 18 and a cutting edge 20 formed oppositely to the base and two parallel sides 22 and 24. A cutting edge 20 is formed by individually transversely grinding (FIG. 6) bevels 28 and 30 in the region between successive scallops with a grinding wheel 29 having a specially contoured profile 31 with an annular portion 33. The bevel is formed by transverse grindings which are individually performed at each scalloped section to produce a series of parting lines 34 at each point or tip 36. As shown in the section views 3(a), 3(b) and 3(c) the bevels 28, 30 converge along the entirety of the scallop to form a keen cutting edge.

Intermediate each valley 16 and peak 14 is a reversely bent protuberance or cutting corner 40 which is smoothly configured and forms a cutting blade section which may be termed a "cutting corner" that protuberates intermediate each crest and each valley. The value of this protuberance is substantial: Its first contribution lies in the improved cutting action, since it forms an additional cutting area that improves the penetrating ability of the knife; also, the cutting corner acts as a salient surface on the blade profile so that it assists in making a clean slice through the bread without causing tearing or shredding of the bread. But the main advantage of this addition of a "cutting corner" is that it contributes in a remarkable way to improving the wear life of the blade in that it prolongs the period of effective usage between honings. Although honings are able to re-establish a keeness of the cutting edge, all such honings operate on the principle of stock removal and inevitably the honings will eventually wear away the stock at the cutting edge to the point that the blade is no longer effective for cutting operation. Hence, to the extent that the blade will retain its keeness and prolong the period between honings, the blade has a correspondingly wear life of greater duration. The cutting corner accomplishes just that. The configuration of the cutting edge is such that by reason of the addition of this protuberance or cutting corner 40 it is possible to use the blade up to three times as long before honing is required to re-establish blade keeness.

The cutting corner 40 is formed by the grinding wheel surface 31 at the time that the tapered surfaces 28, 30 are formed in the sides of the blade. The cutting corner is established because of the presence of annular portion 33 of the wheel.

The protuberance or cutting corner 40 has a yet further advantage which will be evident from FIGS. 7(a), 7(b) and 7(c). 7(a) represents the blade after it has been honed slightly from the profile shown in FIG. 4. The added protuberance or "cutting corner" 40 increases the available stock which may be removed before the blade loses its effective profile, progressively successively from recurrent honings from the condition of 7(a), to 7(b) and then 7(c). At 7(c) the honings have so altered the profile of the blade that at this point the blade must be discarded. But before reaching the condition of 7(c) the blade retains its efficiency in cutting profile and because of the cutting corner 40 there is provided a greater stock amount which makes it possible to perform a greater number of honings between the period of its original configuration 7(a) and the ultimate worn profile configuration 7(c).

After the blade has been scalloped and profiled with the cutting corners 40 indicated in FIG. 2, a transverse or longitudinal grinding, (depending on which is preferred), can be further made of the blade shown in FIG. 2 to that of FIG. 4. The blade in FIG. 2 has a superimposed longitudinal taper and the grind line extends longitudinally of the blade. The superimposed taper is indicated by reference numerals 50, 52 wherein there is additional stock removal which provides relief on the blade facilitating movement of the blade through the article being cut, as for example, bread. This additional superimposed grinding at the opposite faces of the blade causes a taper which converges inwardly in the direction of the cutting line or cutting edge. The additional grinding which changes the blade configuration from FIG. 2 to FIG. 4 is not essential but in many instances is preferred.

It should be understood that the present invention has applicability to any basic blade configuration and whether a cutting edge is formed by grinding a taper at one side of the blade only or at both sides of the blade or alternating, at first one side and then the other of the blade. As for example, in the blade configuration shown in FIGS. 8 and 9 the grinding is performed first at one blade side and then the other blade side to form the cutting edge 60. The formation of a "cutting corner" 61 will greatly improve the penetrating ability of the blade and prolong its wear life. Also, the scallop formation can be of any preferred configuration so long as there is formed intermediate each valley 62 and crest 64 a cutting corner 61 which as in the previous embodiments is a protuberance or salient in the cutting edge intermediate the valley and crest. The protuberance in each instance should extend in the direction of blade movement and if desired, it need not be formed on each side of the crest but only on the side of the crest which faces the direction of blade movement, as for example, in the direction of the arrow 70 in FIGS. 7(a)–7(c). In the embodiment shown in FIGS. 8, 9 the body of the blade is ground so that tapers are formed first at one side 72 and then side 74. It is equally contemplated in the present invention (FIGS. 10, 11) that grindings can form converging tapers 82, 84 which intersect at the cutting edge 80. In each instance, however, the cutting corner 85 maximizes the cutting action and produces a prolongation of useful life by enabling a greater number of honings before the profile of the blade is altered from one having an efficient cutting configuration to one having a less efficient cutting ability.

By means of the present invention, I am enabled to greatly increase the wearlife of a blade to an extent far beyond any blades heretofore proposed and with any preferred scallop and blade edge configuration. While the cutting action is described and illustrated in connection with cutting bread it is further contemplated that other articles of similar consistency and physical property may also be used with the present invention.

While the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What I claim is:

1. A cutting blade comprising a thin flexible body having two opposite sides, a base, and a cutting edge, a plurality of regularly spaced scallops formed along the cutting edge and forming a series of successive crests which terminate at sharp cutting points and valleys at the base of the respective scallops, a series of beveled faces which extend along the profile of the cutting edge and tapered inwardly toward the cutting edge, and a cutting corner formed on the cutting edge which is disposed intermediate each crest and valley to form a smooth protubering cutting corner along the cutting edge, said cutting corner forming a protuberance on the cutting edge intermediate each crest and valley and facing in the direction of blade movement.

2. A blade construction in accordance with claim 1 including a second superimposed taper inclined one on each side of the blade toward the cutting edge which forms a profile with a secondary bevel providing regions of relief for the cutting blade.

3. A blade construction in accordance with claim 1 wherein said cutting corner is disposed at locations of said scallops facing and opposing the direction of blade movement and providing for substantial stock removal at successive honings whereby the angle of attack of the cutting edge is substantially unaffected by successive honings.

4. A slicing band for cutting bread comprising an elongated thin body having a cutting edge and opposite generally parallel sides, said cutting edge being scalloped lengthwise to provide successive regularly spaced peaks and valleys, said peaks being collinear and located between the parallel sides of the band, primary and secondary bevelled faces extending throughout the length of the body and respectively adjoining the sides of the body and converging from the body toward the cutting edge to thin out the thickness of the body between the body and the cutting edge, and a cutting corner formed along the cutting edge intermediate each alternate peak and valley which forms a protuberance projecting in the direction of blade movement.

5. A slicing band in accordance with claim 4 wherein the scallop contour at the valley is reversely contoured intermediate the successive peaks and valleys to form said cutting corner at each scallop intermediate the respective peaks and valleys.

6. A slicing band in accordance with claim 5 wherein the cutting corners are disposed substantially midway between the peaks of the cutting edge and the valleys adjacent the base.

* * * * *